(12) United States Patent
Kahler et al.

(10) Patent No.: US 6,712,412 B2
(45) Date of Patent: Mar. 30, 2004

(54) GRILL IMPLEMENTS WITH REMOVABLE HANDLE

(75) Inventors: Andrew Kahler, Fortson, GA (US); John R. Holman, Columbus, GA (US); Ryan Neal, Midland, GA (US)

(73) Assignee: W. C. Bradley Company, Columbus, GA (US)

( * ) Notice: Subject to any disclaimer, the term of this patent is extended or adjusted under 35 U.S.C. 154(b) by 6 days.

(21) Appl. No.: 10/159,576

(22) Filed: May 31, 2002

(65) Prior Publication Data

US 2002/0178542 A1 Dec. 5, 2002

Related U.S. Application Data

(60) Provisional application No. 60/294,986, filed on Jun. 1, 2001.

(51) Int. Cl.$^7$ .................... A47J 45/10; B65D 25/28
(52) U.S. Cl. .................... 294/30; 294/27.1; 16/425; 220/759
(58) Field of Search ............ 294/27.1, 30, 31.1, 294/34, 28, 29; 16/110.1, 422, 425; 220/758, 759, 761, 762, 767, 770

(56) References Cited

U.S. PATENT DOCUMENTS

| | | | | | |
|---|---|---|---|---|---|
| 938,187 | A | * | 10/1909 | Walker | 294/34 |
| 1,015,176 | A | * | 1/1912 | Hall | 220/759 |
| 1,268,089 | A | * | 6/1918 | Borsse | 220/759 |
| 1,473,335 | A | * | 11/1923 | Chandler | 220/759 |
| 1,943,585 | A | * | 1/1934 | Cummins et al. | 294/27.1 |
| 2,106,391 | A | * | 1/1938 | Durau | 294/31.1 |
| 2,368,297 | A | * | 1/1945 | Hanke | 220/759 |
| 3,065,018 | A | * | 11/1962 | Serio | 294/31.1 |
| 3,648,887 | A | * | 3/1972 | Hartley | 220/759 |
| 4,171,144 | A | * | 10/1979 | Rodriguez | 294/30 |
| 6,250,493 | B1 | * | 6/2001 | Kwan | 220/759 |
| 6,257,439 | B1 | * | 7/2001 | Hsu | 220/759 |
| 6,439,421 | B1 | * | 8/2002 | Lin | 220/759 |

* cited by examiner

*Primary Examiner*—Dean J. Kramer
*Assistant Examiner*—Paul T. Chin
(74) *Attorney, Agent, or Firm*—James W. Kayden; Thomas, Kayden, Horstemeyer & Risley, LLP

(57) ABSTRACT

A removable handle and method for use including a grip having a top surface, a bottom surface, a front end, a back end, a button orifice, a locking wire channel, and a pair of recesses disposed on the front end of the grip. A locking wire including a hook end is disposed in the locking wire channel and the hook end is configured to engage the cooking implement. A pair of support posts is disposed in the pair of recesses and the support posts include a pair of support post ends configured for insertion into the cooking implement. A button is disposed in the button orifice and is arranged and configured to deflect the hook end between an engaged position and a disengaged position.

14 Claims, 5 Drawing Sheets

GRILL IMPLEMENTS WITH REMOVABLE HANDLE

CROSS-REFERENCE TO RELATED APPLICATION

This application claims priority to copending U.S. provisional application entitled, "Grill Implements with Removable Handle," having Serial No. 60/294,986, filed Jun. 1, 2001, which is entirely incorporated herein by reference.

FIELD OF THE INVENTION

The invention relates to implements for use in cooking and, more particularly, to an improved removable handle for use with those implements.

BACKGROUND OF THE INVENTION

Quite often, it is desirable to make handles for cooking implements, such as pots, pans, skillets, fry baskets, etc., out of materials that are different than those materials used to construct the implement. This can be because an insulative material is desired, a more comfortable material to grasp is desired, a material possessing certain ornamental aspects is desired, or for any number of other reasons. Frequently, these materials are not as durable as those materials used to construct the actual portions of the implement that are directly exposed to the heating surfaces used. As well, the materials used to construct the handle often do not withstand the harsh environment inside a dishwasher very well.

A major problem that has been observed with cooking implements having handles constructed of materials other than those used to construct the implement is that when the materials used to manufacture the handles becomes warn, as noted above, the handle may become unusable and necessitate replacement of the entire implement. Even in those situations where the handle remains usable, but is unsightly, the owner of the implement may choose to replace the implement at significant cost.

Cooking implements with removable handles offer a myriad of advantages over traditional cookware with fixed handles. A removable handle that can be used with a number of cooking implements permits the user to own only one handle for the numerous implements that he or she may own. Removable handles greatly reduce the storage space required when the implements are not being used. Along similar lines, removable handles permit manufacturers of these implements to save money on shipping products because reduced space required for packaging translates into reduced costs for getting products to market. As well, especially when cooking on a barbecue grill where space is often at a premium, removable handles allow more effective use of the cooking surface. Furthermore, removable handles increase safety in that without handles extending beyond the edge of the cooking surface being used, the potential for spill type accidents is greatly reduced.

Although removable handles do exist for cookware, prior art attempts are often plagued by problems like not attaching securely enough to the cookware.

SUMMARY OF THE INVENTION

In accordance with the present invention, a removable handle is provided that firmly and securely attaches to an associated cooking implement. An embodiment of the removable handle comprises a grip having a top surface, a bottom surface, a front end, a back end, a button orifice, a locking wire channel, and a pair of recesses disposed on the front end of the grip. A locking wire including a hook end is disposed in the locking wire channel and the hook end is configured to engage the cooking implement. A pair of support posts is disposed in the pair of recesses and the support posts are configured for insertion into the cooking implement. A button is disposed in the button orifice and is arranged and configured to deflect the hook end between an engaged position and a disengaged position.

Also provided are methods of attaching a removable handle to a cooking implement. One embodiment includes the steps of pressing and holding a button such that a locking wire having a hook end is deflected into a disengaged position. Next, a pair of support posts are inserted into a pair of support channels formed in the cooking implement and the button is released such that the locking wire returns to an engaged position. When the locking wire returns to the engaged position, the hook end engages a portion of the cooking implement.

These and other objects and advantages of the present invention will become apparent upon reading the following description, the illustrative embodiments describing the principles of the present invention with reference to the attached drawings, wherein like reference numerals have been used to refer to like parts throughout the several figures.

Figure 1A:
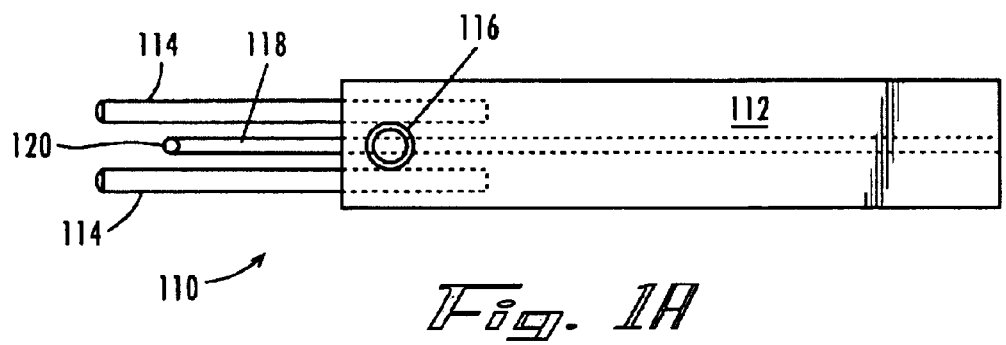
FIGS. 1A–1E show varying views of the removable handle of the present invention, showing a preferred embodiment.

Reference will now be made in detail to the description of the removable handle for use with grilling implements as illustrated in the drawings. While the removable handle for use with grilling implements will be described in connection with these drawings, there is no intent to limit it to the embodiment or embodiments disclosed therein. On the contrary, the intent is to cover all alternatives, modifications and equivalents included within the spirit and scope of the removable handle for use with grilling implements as defined by the appended claims.

DETAILED DESCRIPTION

Figure 1B:
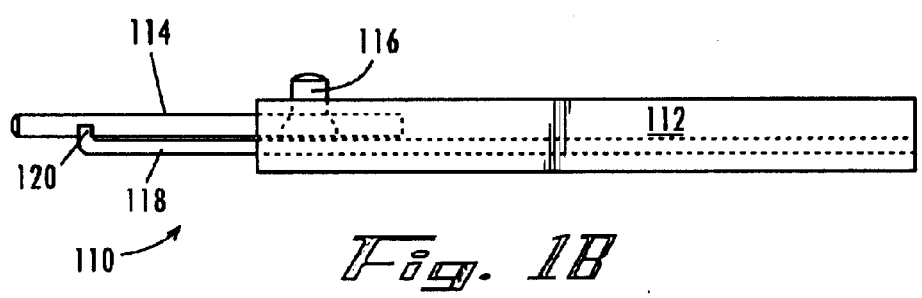
Figure 1C:
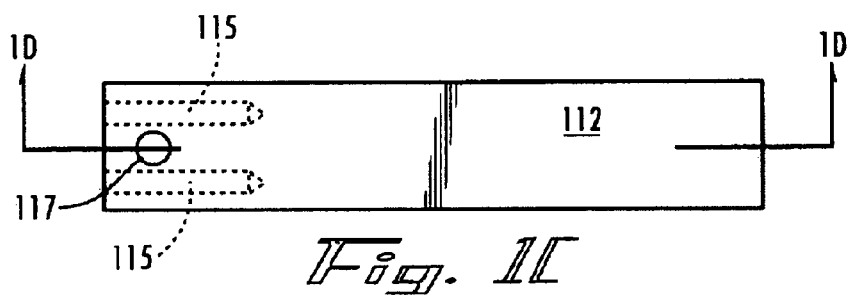
Figure 1D:
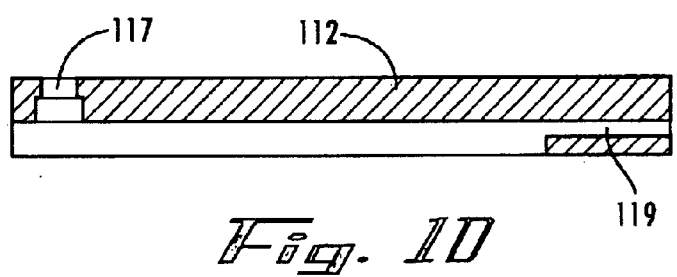
Figure 1E:
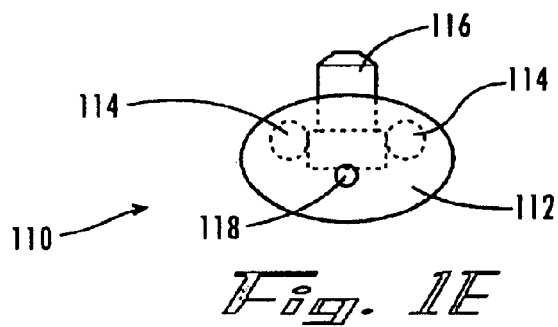
Figure 5A:
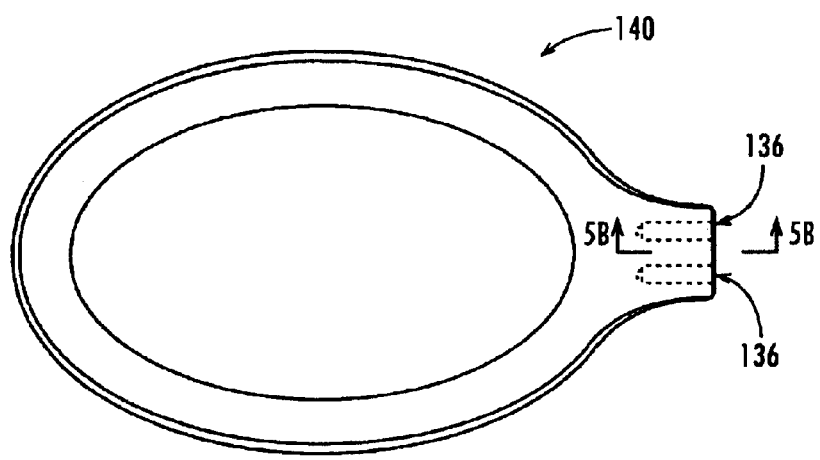
FIGS. 5A–5E show varying views of a fajita skillet for use with the removable handle shown in FIGS. 1A and 1B.
Figure 5B:
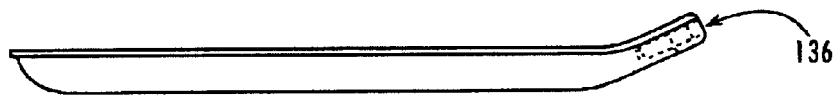
Figure 5C:
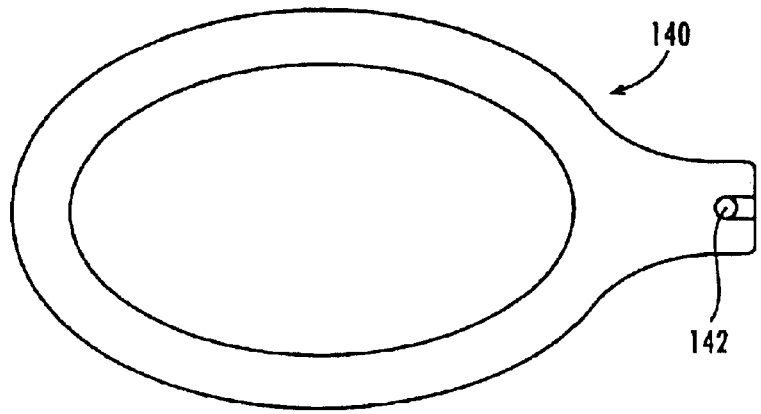
Figure 5D:
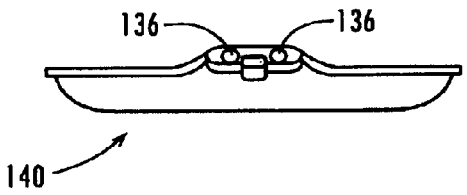
Figure 5E:
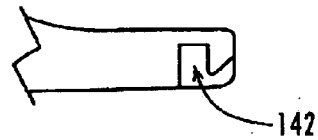

Referring now to FIGS. 1A and 1B, a top view and a side view, respectively, of the removable handle 110 of the present invention are shown. A grip 112 can be made of any suitable material such as, plastic, metal, wood, etc., and in a preferred embodiment, wood is used. Support posts 114 are secured in recesses 115 (FIG. 1C), such that their ends extend beyond the grip 112. A button 116 is placed in the button orifice 117 formed in the top surface of the grip 112. Next, locking wire 118 is secured in the locking wire channel 119. The locking wire 118 includes a hook 120 for engaging a matching hole 132 (FIGS. 2A–2C) or matching recess 142 (FIGS. 5C and 5E).

Figure 2A:
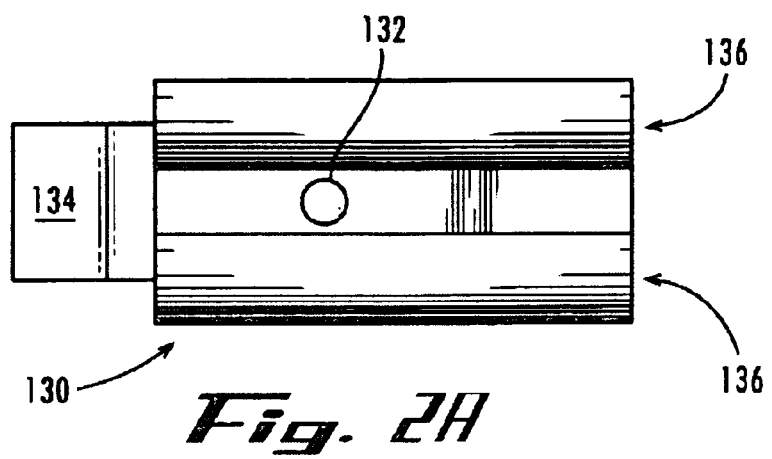
FIGS. 2A–2C show varying views of an attachment bracket of the present invention for use with the removable handle shown in FIGS. 1A and 1B.
Figure 2B:
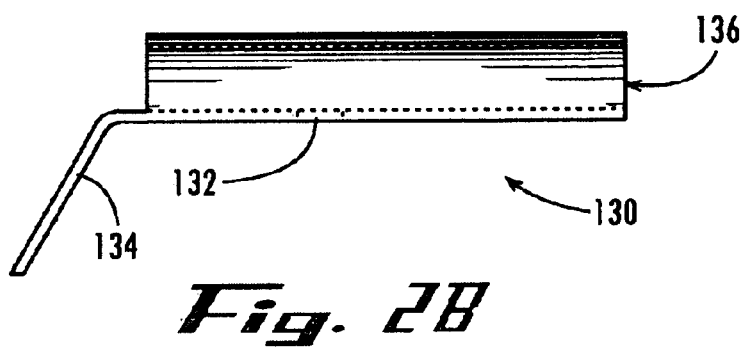
Figure 2C:
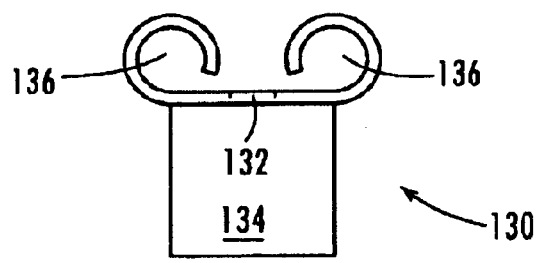
Figure 3A:
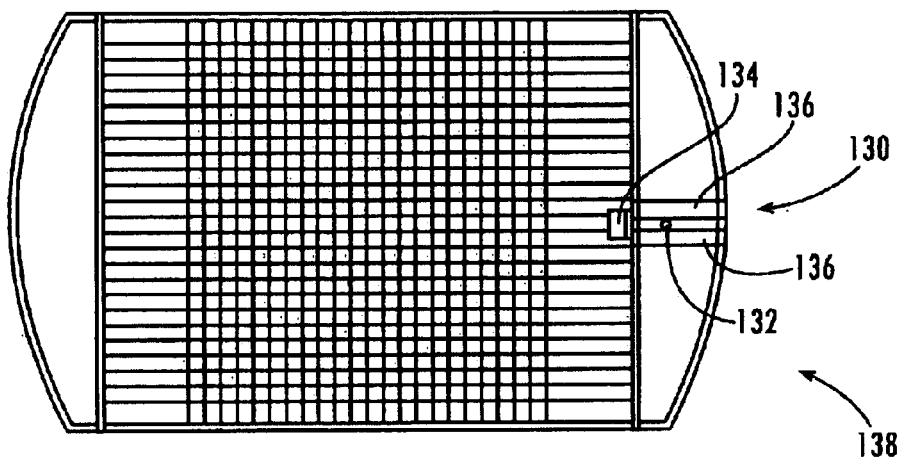
FIGS. 3A and 3B show a top and a side view, respectively, of a shaker basket including the attachment bracket shown in FIGS. 2A–2C.
Figure 3B:
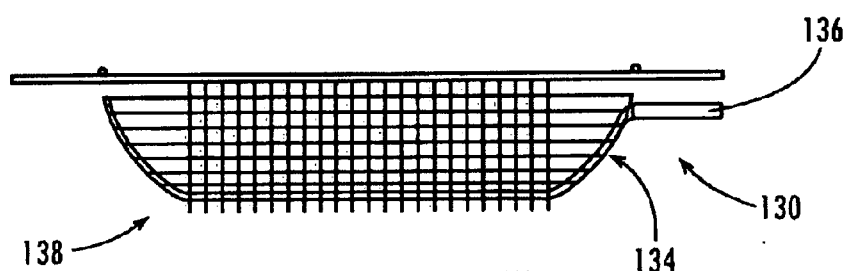
Figure 4:
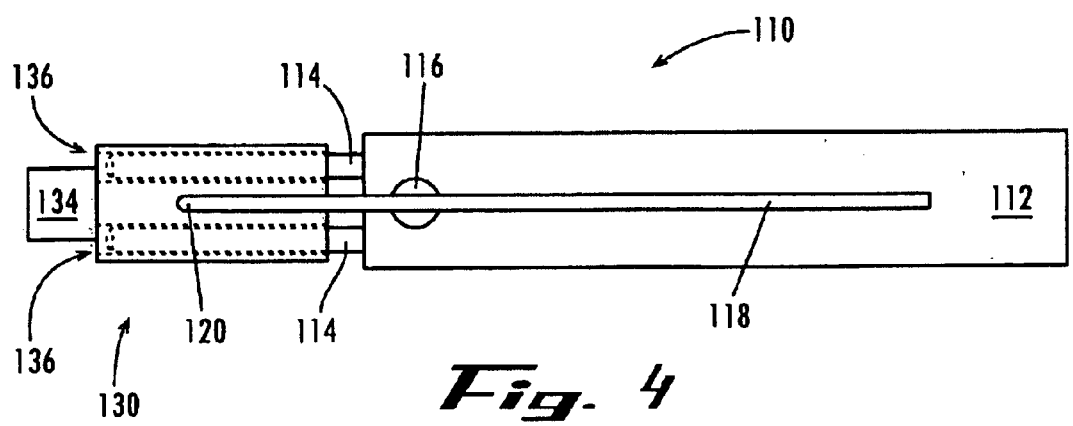
FIG. 4 shows a bottom view of the removable handle shown in FIGS. 1A and 1B attached to the attachment bracket shown in FIGS. 2A–2C.

Referring now to FIGS. 2A–2C, an attachment bracket 130 for use with the removable handle 110 (FIGS. 1A and 1B) is shown. Attachment bracket 130 includes a matching hole 132 configured to receive the hook end 120 (FIGS. 1A and 1B) of the locking wire 118 (FIGS. 1A and B), a tongue 134, and support channels 136. The tongue 134 can be secured to various cooking implements by any suitable means. The support channels 136 receive the support posts 114 (FIGS. 1A and 1B) of the removable handle 110 (FIGS. 1A and 1B), and once the hook end 120 (FIGS. 1A and 1B) engages the matching hole 132, the removable handle 110 is secured to the cooking implement. FIGS. 3A and 3B show a shaker basket 138 including the attachment bracket 130. FIG. 4 shows a bottom view of the removable handle 110 secured to the attachment bracket.

Figure 6:
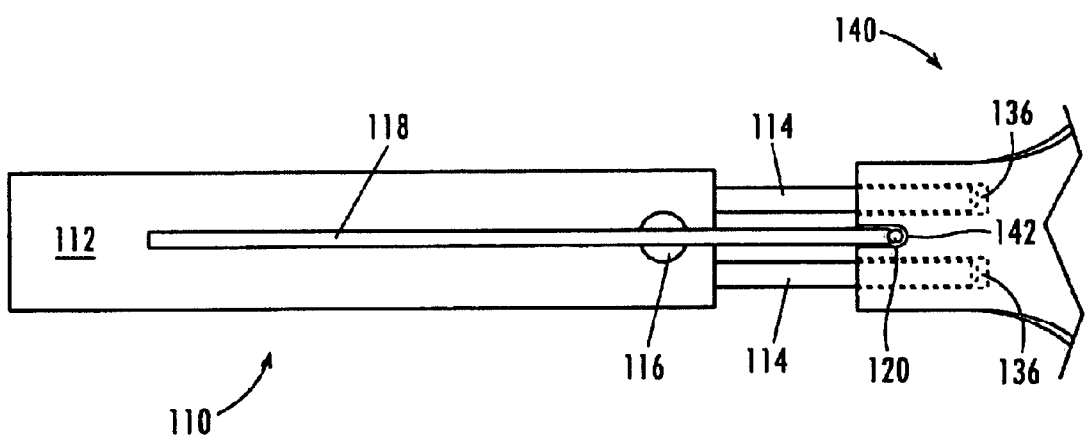
FIG. 6 shows a bottom view of the removable handle shown in FIGS. 1A and 1B attached to the fajita skillet shown in FIGS. 5A–5E.

Referring now to FIGS. 5A–5E, a fajita skillet 140 for use with the removable handle 110 (FIGS. 1A and 1B) is shown. Note that both the support channels 136 and matching recess 142 are formed integrally within the cooking implement. Referring to FIG. 6, similar to the previous discussion, to attach the removable handle 110 to the fajita skillet 140, button 116 is depressed and insert the support posts 114 are inserted into the support channels 136. Once the support posts 114 are firmly seated, the button 116 is released, thereby engaging matching recess 142 with the hook end 120 of the locking wire 120. Removal of the removable handle 110 is the reverse of attachment.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A removable handle for use with a cooking implement, comprising:
   a grip having a top surface, a bottom surface, a front end, a back end, a button orifice, a locking wire channel, and a pair of recesses disposed on said front end of said grip;
   a locking wire including a hook end, said locking wire being disposed in said locking wire channel, said hook end being configured to engage the cooking implement;
   a pair of support posts being configured for insertion into the cooking implement, each of said pair of support posts being respectively disposed, one in each of said pair of recesses; and
   a button disposed in said button orifice, said button being arranged and configured to deflect said hook end between an engaged position and a disengaged position.

2. The removable handle of claim 1, wherein said grip is comprised of wood.

3. The removable handle of claim 1, wherein said grip is comprised of plastic.

4. The removable handle of claim 1, wherein said locking wire is disposed between said pair of support posts and said hook end and said pair of support posts extend beyond said front end.

5. The removable handle of claim 1, wherein said locking wire channel runs from said back end to said front end and passes through said button orifice.

6. The removable handle of claim 1, wherein said grip has a substantially oval cross-section.

7. A method of attaching a removable handle to a cooking implement, the removable handle including a button, a pair of support posts, and a locking wire with a hook end, the cooking implement including a pair of support channels, comprising the steps of:
   pressing and holding the button such that the hook end of the locking wire is deflected into a disengaged position;
   inserting the pair of support posts into the pair of support channels formed in the cooking implement; and
   releasing the button such that the locking wire returns to an engaged position, wherein the hook end engages a portion of the cooking implement.

8. The method of claim 7, wherein the portion of the cooking implement further comprises a matching hole for receiving said locking wire.

9. The method of claim 8, wherein the pair of support channels and the matching hole are formed in a bracket, the bracket being secured to said cooking implement.

10. The method of claim 7, wherein the portion of the cooking implement further comprises a matching recess for receiving said locking wire.

11. The method of claim 10, wherein the pair of support channels and the matching recess are integral to the cooking implement.

12. A cooking implement including a removable handle, comprising:
   a grip having a top surface, a bottom surface, a front end, and a back end;
   a pair of support posts disposed in parallel, said pair of support posts being securely attached to said grip;
   a locking wire including a hook end, said locking wire being securely disposed in said grip;
   a button disposed in said grip, said button being arranged and configured to deflect said hook end downwardly; and
   wherein said pair of support posts are arranged and configured for insertion into a pair of support channels disposed on said cooking implement, and said hook end is arranged and configured to engage a portion of said cooking implement.

13. The cooking implement of claim 12, wherein said portion of said cooking implement further comprises a matching recess, and wherein said pair of support channels and said matching recess are formed integrally with said cooking implement.

14. The cooking implement of claim 12, wherein said portion of said cooking implement further comprises a matching hole, and wherein said pair of support channels and said matching hole are disposed on a bracket, said bracket being secured to said cooking implement.

* * * * *